R. HUFF.
UNIVERSAL JOINT.
APPLICATION FILED JAN. 27, 1908.
1,080,111.
Patented Dec. 2, 1913.
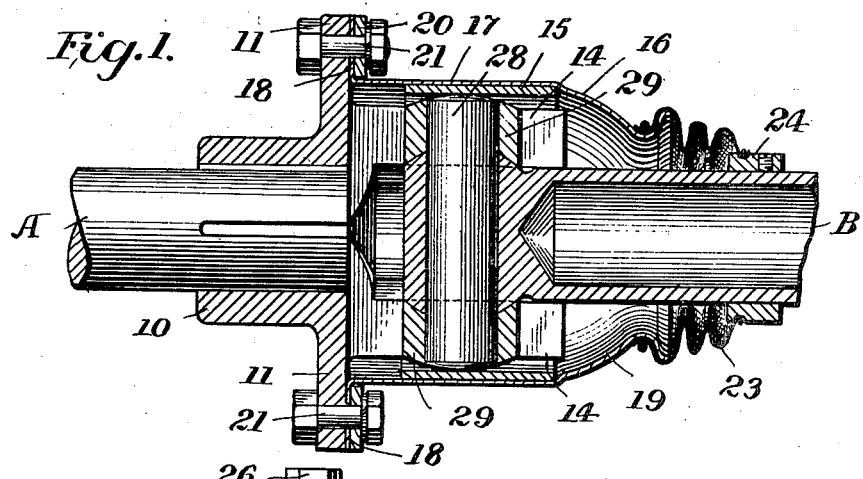
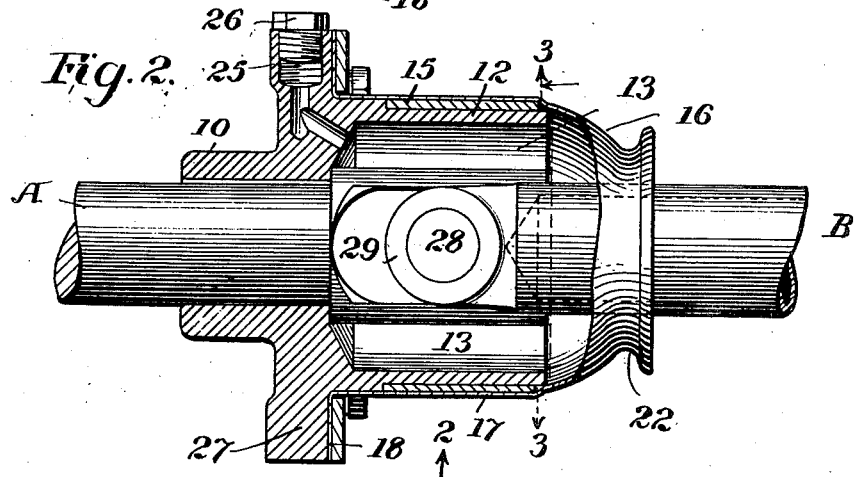
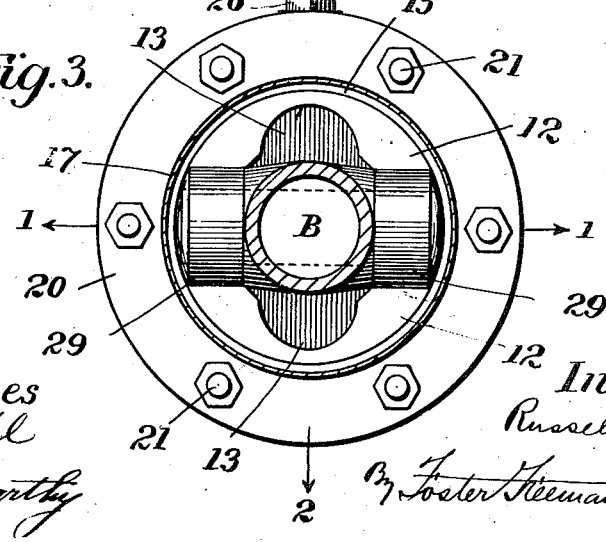
Witnesses
J. G. Finkel
J. J. McCarthy
Inventor
Russell Huff
By Foster Freeman Watson & Coit

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

UNIVERSAL JOINT.

1,080,111.     Specification of Letters Patent.     Patented Dec. 2, 1913.

Application filed January 27, 1908. Serial No. 412,865.

*To all whom it may concern:*

Be it known that I, RUSSELL HUFF, a citizen of the United States, and resident of Detroit, Wayne county, State of Michigan, have invented certain new and useful Improvements in Universal Joints, of which the following is a specification.

The object of the present invention is to simplify the construction of universal joints, such as are used in the drive shafts of motor vehicles and to produce a joint which may be readily lubricated and which will hold lubricating material and exclude dirt and dust, thereby decreasing the friction in the joint to a minimum and prolonging its life.

The invention will be described in connection with the accompanying drawing, in which, Figure 1 is a longitudinal section through a universal joint embodying the invention upon the line 1—1 of Fig. 3; Fig. 2 is a similar section upon the line 2—2 of Fig. 3; and Fig. 3 is a transverse section upon the line 3—3 of Fig. 2.

Referring to the drawing, A, B, are the two shaft sections which are united flexibly by the universal joint. Either one of these shaft sections may be the driven shaft and the other the driving shaft. Upon the end of the section B is a cross head and upon the end of the section A a housing surrounding the cross head, both of which features will be presently described.

Upon the end of section A is securely fastened a head comprising a hub or collar 10 having a circular flange 11 approximately registering with the end of the shaft and two jaws 12 extending beyond the end of the shaft. Each of the jaws 12 has a central recess 13 and working faces 14 on opposite sides of said recess, the working faces of the two jaws being opposed and parallel.

The jaws 12 have cylindrical outer surfaces to which a ring 15 is securely fitted, for a purpose to be hereinafter mentioned. At the rear or inner end of the ring 15 the jaws are preferably of the same diameter as the outer surface of the ring so that the ring and the exposed portions of the jaws form a uniform cylindrical surface.

A sheet metal casing 16 has a cylindrical portion 17 fitting over the jaws 12 and the ring 15, a flange 18 fitting against the flange 11, and a reduced portion or throat 19 extending beyond the jaws and surrounding the shaft section B, the throat being sufficiently large to permit the shaft section B to assume any of its operative positions without touching the casing. The flange 18 is securely clamped between the flange 11 and a ring 20, these parts being connected by suitable bolts or screws 21. The forward part of the throat 19 has an external groove or annular depression 22 to which is secured one end of a flexible tube 23, the other end of said tube being securely connected to a ring 24 which is fast on the shaft B. The tube 23 permits of the universal relative movement of the shaft sections while it forms a dust proof closure for the casing 19. The flange 11 is provided with a boss 25 in which is a radially arranged oil hole normally closed by a screw cap 26. Diametrically opposite to the boss 25 is a second boss 27 of sufficient weight to counter-balance the parts 25 and 26. The oil hole in the part 25 communicates directly with the interior of the joint and forms a convenient means for oiling the joint.

Upon the inner end of the shaft section B is a cross head or pin 28 carrying a pair of anti-friction rollers 29 which are free to move back and forth on the parallel ways or faces 14 of the jaws 12. The ring 15, which is preferably constructed of steel, holds the rollers on the cross head and keeps the cross head in proper position within the casing. During the rotation of the shaft sections, when one end is at a slight angle to the other, the rollers 29 run back and forth on the ways 14 and the shaft section B swings more or less into each of the recesses 13 in the jaws.

The universal joint herein described is dirt proof and adapted to contain a considerable quantity of lubricating material without leakage, while at the same time it is adapted to work with perfect freedom.

Having described my invention what I claim and desire to secure by Letters-Patent is, 1. In a universal joint for shafting, the combination with a shaft section having a cross head and anti-friction rollers, of a second shaft section having securely connected therewith an annular flange and jaws provided with ways for the cross head rollers, a ring surrounding said jaws and adapted to guide the cross head rollers on the ways, a casing surrounding said ring and jaws and adapted to hold the ring in place and means for securely connecting said casing with said annular flange.

2. In a universal joint for shafting, the combination with a shaft section having a cross head and anti-friction rollers, of a second shaft section having securely connected therewith an annular flange and jaws provided with ways for the cross head rollers, a ring surrounding said jaws and adapted to guide the cross head rollers on the ways, and a casing having a cylindrical portion surrounding said ring and jaws, a flange connected to the aforesaid annular flange and a throat or contracted portion surrounding the first named shaft section.

3. In a universal joint for shafting, the combination with a shaft section having a cross head and anti-friction rollers, of a second shaft section having securely connected therewith a head provided with a pair of jaws, said jaws having ways for the cross head rollers, a ring surrounding and securely fitted to said jaws and adapted to guide the cross head and rollers, a casing surrounding and closely fitted to said ring and jaws and adapted to hold the ring in place, and means connecting said casing securely to said head.

4. In a universal joint for shafting, the combination with a shaft section having a cross head and anti-friction rollers, of a second shaft section having securely connected therewith a head provided with a pair of jaws, said jaws having ways for said cross head rollers, a ring surrounding and securely fitted to said jaws, and a casing fitting over and inclosing said ring and jaws and adapted to hold the ring in place, said casing being securely connected with said head and having a reduced portion or throat surrounding the first named shaft section, for the purpose set forth.

In testimony whereof I affix my signature in presence of two witnesses.

RUSSELL HUFF.

Witnesses:
L. C. TENNEY,
CLARA I. DALE.